United States Patent
Carrott et al.

(10) Patent No.: US 6,839,692 B2
(45) Date of Patent: Jan. 4, 2005

(54) METHOD AND APPARATUS TO PROVIDE SECURE PURCHASE TRANSACTIONS OVER A COMPUTER NETWORK

(75) Inventors: Richard F. Carrott, Moorpark, CA (US); Hirshol H. Pheir, Agoura Hills, CA (US)

(73) Assignee: Benedor Corporation, Moorpark, CA (US)

( * ) Notice: Subject to any disclaimer, the term of this patent is extended or adjusted under 35 U.S.C. 154(b) by 579 days.

(21) Appl. No.: 09/726,304

(22) Filed: Dec. 1, 2000

(65) Prior Publication Data

US 2002/0069177 A1 Jun. 6, 2002

(51) Int. Cl.[7] ................................................ G06F 17/60

(52) U.S. Cl. .......................... 705/64; 705/74; 705/75; 705/39; 705/44; 235/380

(58) Field of Search ........................... 705/64, 65, 74, 705/75, 76, 38, 39, 44; 235/380, 382

(56) References Cited

U.S. PATENT DOCUMENTS

| | | | |
|---|---|---|---|
| 4,283,599 A | | 8/1981 | Atalla ......................... 178/22.1 |
| 5,191,611 A | * | 3/1993 | Lang ............................. 380/25 |
| 5,319,710 A | | 6/1994 | Atalla et al. ................... 380/23 |
| 5,724,424 A | | 3/1998 | Gifford ......................... 380/24 |
| 5,809,144 A | | 9/1998 | Sirbu et al. ..................... 380/25 |
| 5,818,937 A | | 10/1998 | Watson ......................... 380/25 |
| 5,857,021 A | * | 1/1999 | Kataoka et al. ................. 380/4 |
| 5,903,721 A | * | 5/1999 | Sixtus .................... 395/187.01 |
| 5,956,699 A | | 9/1999 | Wong et al. ................... 705/39 |
| 5,974,148 A | * | 10/1999 | Stambler ....................... 380/25 |
| 6,000,832 A | * | 12/1999 | Franklin et al. ............ 235/379 |
| 6,006,200 A | * | 12/1999 | Boies et al. ................... 705/26 |
| 6,078,902 A | | 6/2000 | Schenkler ..................... 705/35 |

(List continued on next page.)

FOREIGN PATENT DOCUMENTS

| | | |
|---|---|---|
| WO | WO 00/75843 A1 | * 12/2000 |
| WO | WO 01/39085 A1 | * 5/2001 |
| WO | WO 01/52212 A1 | * 7/2001 |
| WO | WO 01/86539 A1 | * 11/2001 |
| WO | WO 01/88770 A1 | * 11/2001 |

OTHER PUBLICATIONS

Corrall, Cecile B., "On–Line Security, Payment Service Aid E–Tailers Stung by Fraud", Discount Store News, vol. 38, No. 8, pp. 20–25, Apr. 19, 1999.*

Anonymous, "Visa: Visa Aims for a Bigger Role in the Travel–and–Entertainment Industry", Dialog File 810:Business Wire, Apr. 7, 1989.*

Kutler, Jeffrey, "Visa Sweetens Payments Deal for Travel Industry", American Banker, vol. 154, No. 68, p. 2, Apr. 7, 1989.*

Anonymous, "An Unlikely Online Merchant", Music Trades, vol. 147, No. 8, p. 58, Sep. 1999.*

*Primary Examiner*—John W. Hayes
(74) *Attorney, Agent, or Firm*—McGinn & Gibb, PLLC (57) ABSTRACT

A method and structure for providing secure credit facility transactions for purchasing goods and services over a computer network such as the Internet that stores user's privileged information and other transactional data on the user's own computer. The method includes encryption of all information before or during its storage to the user's hard drive. The method and system includes the ability for the user to complete electronic commerce (e-commerce) transactions without revealing certain of the encrypted information, such as credit card numbers, to the merchant. The method and system creates and controls sub-accounts on a single credit facility, such as a credit card, with unique user reporting and corresponding password identifiers. The method and system sets and control sub-accounts spending amounts and replenishment periods. The method enables the user to create and control recurring debit accounts on a single credit facility, such as a credit card, over varying transactional periods.

30 Claims, 3 Drawing Sheets

U.S. PATENT DOCUMENTS

| | | | |
|---|---|---|---|
| 6,108,642 A | 8/2000 | Findley | 705/44 |
| 6,122,624 A | 9/2000 | Tetro et al. | 705/44 |
| 6,163,771 A * | 12/2000 | Walker et al. | 705/39 |
| 6,226,624 B1 * | 5/2001 | Watson et al. | 705/44 |
| 6,339,766 B1 * | 1/2002 | Gephart | 705/44 |
| 6,456,984 B1 * | 9/2002 | Demoff et al. | 705/40 |
| 2001/0037253 A1 * | 11/2001 | Kensey | 705/26 |
| 2001/0044785 A1 * | 11/2001 | Stolfo et al. | 705/74 |
| 2002/0049644 A1 * | 4/2002 | Kargman | 705/26 |
| 2002/0091646 A1 * | 7/2002 | Lake et al. | 705/67 |
| 2002/0111919 A1 * | 8/2002 | Weller et al. | 705/67 |
| 2002/0116341 A1 * | 8/2002 | Hogan et al. | 705/64 |
| 2002/0128977 A1 * | 9/2002 | Nambiar et al. | 705/64 |
| 2003/0028481 A1 * | 2/2003 | Flitcroft et al. | 705/39 |
| 2003/0046237 A1 * | 3/2003 | Uberti | 705/44 |
| 2003/0105723 A1 * | 6/2003 | Skea | 705/64 |

* cited by examiner

METHOD AND APPARATUS TO PROVIDE SECURE PURCHASE TRANSACTIONS OVER A COMPUTER NETWORK

BACKGROUND OF THE INVENTION

1. Field of the Invention

The present invention generally relates to a system for providing security for purchase transactions made over a network and more particularly to an improved security system that only stores and provides encrypted information. Additionally, the invention relates to a system for providing customer controlled rules, including time and value limits, for purchase transactions made over a network.

2. Description of the Related Art

The increase in popularity of personal computers and of networks connecting personal computers has caused a dramatic increase in electronic commerce (e-Commerce) in recent decades. One example of a very popular network is the World Wide Web (WWW) or Internet. However, one aspect that has been hampering e-commerce is the inability to provide a convenient and secure payment system.

Many conventional e-commerce payment systems require elaborate passwords/encoding algorithms that are cumbersome and not user-friendly. Other conventional e-commerce payment systems require all parties involved to agree on a security format. Such systems suffer from the disadvantage that only those parties that have joined the "club" and have agreed to the specific encoding format can participate. Considering the rate at which merchant sites are being added and withdrawn from current networks (e.g., Internet), requiring merchants to agree on a specific format is unrealistic.

Other e-commerce payment systems require prepayments to a third-party vendor that, in turn, issues a coded credit against that deposit. Besides creating yet another layer to online transactions, these "wallet" and "Internet cash" programs also create another layer of exposure for the customer's information. Additionally, these systems require that both the customer and merchant register to participate in the various versions of these systems.

Still other e-commerce payment systems require the user to purchase specific hardware (e.g., a credit card reader) that is proprietary in nature and awkward to install and use. In addition, the user is required to transport the hardware device if purchases are to be made at other computers, which hampers this type of payment system.

No matter the payment system, the common thread shared by conventional systems is that the customer must provide private information in order to complete a transaction—to the merchant, to a potential third-party, and to the merchant's financial institution. This requirement is the biggest impediment to conventional systems because of the exposure to the customer, perceived or otherwise. Whether the customer obtains additional hardware or merely entrusts private information to third-party vendors, the customer's information ends up stored in someone else's database. The vulnerability of these stored records is a matter of deep concern to potential customers and to policy makers.

The problem is a matter of how many times a customer must expose private, sensitive, and/or confidential information in order to transact business over a network environment such as the Internet.

SUMMARY OF THE INVENTION

It is, therefore, an object of the present invention to provide a structure and method of securing purchase transactions over a computer network. The invention encrypts customer information as a customer code on a storage device on a customer computer (the customer computer is connected to the computer network). Then the invention supplies the customer code to a merchant in a purchase transaction over the computer network and forwards, or allows the merchant to forward, the customer code to a financial institution over the computer network. The financial institution decrypts the customer code, verifies the information, and returns a purchase authorization decision to the merchant over the computer network.

An important feature of the invention is that encoded customer information, such as credit card numbers ("customer code"), is not available to merchants and, therefore, is not vulnerable to the merchant's security or privacy entrustments. The customer code is stored on the customer's storage device only, and it is in encrypted form. This allows the customer to complete merchant transactions without revealing certain of the encrypted information to the merchant, such as credit card numbers. The financial institution compares, inter alia, the customer address with historic address information of the customer maintained by the financial institution. Customers may maintain more than one authorized shipping address. The purchase authorization decision is approved only if the customer address and the historic address are consistent. If authorization is not approved, on the basis of incorrect address information, the options to the financial institution include: 1) approving the transaction with the corrected address; 2) approving the transaction subject to the customer updating his/her address information prior to the issuance of the authorization code; and, 3) declining authorization.

Securing the customer's information before it is exposed to a network environment allows the customer to retain control and expand the use of his/her credit facility online. This is a paramount difference between the present invention and conventional e-commerce payment systems.

The present invention allows the customer to access his/her information by means of a personal key, or access code, however only the financial institution and its agents possess the decryption key, or code. Thus, the invention provides secure use of the customer's information without adding layers or third-parties and without exposing that information to a myriad of databases. In the preferred embodiment, the customer code includes encrypted credit card information.

In an additional embodiment, the invention can encrypt many customer codes on the storage device. Each of the customer codes can include a unique payment method. Alternatively, one group of the customer codes can identify a single credit organization for payment, wherein each customer code in the group includes a different user name. This allows each customer code in the group to include unique credit limits and allows the customer to authorize additional users for a single credit organization or facility. The invention also uses a password on the customer computer to unlock the customer code.

In another embodiment, the invention comprises a system that operates on a customer computer. The inventive system includes an encrypter adapted to encrypt customer information as a customer code on a storage device on the customer computer and a populator adapted to supply the customer code to a merchant in a purchase transaction over the computer network. The customer computer includes a network connection adapted to forward the customer code to a financial institution over the computer network. The financial institution decrypts the customer code and returns a purchase authorization decision to the merchant over the computer network.

The customer code preferably includes encrypted customer address information, and the system further comprises a comparator located at the financial institution. The comparator compares the customer address with a historic address of the customer maintained by the financial institution. The purchase authorization decision is approved only if the customer address and the historic address are consistent.

The system can optionally include an intermediate code confirmation site, external to the customer computer, and connected to the computer network. The intermediate code confirmation site receives the customer code prior to forwarding the customer code to the financial institution over the computer network. The intermediate confirmation site confirms whether the customer code has a proper encryption format.

The encrypter can also encrypt a plurality of customer codes on the storage device. As mentioned above, each of the customer codes can include a unique payment system or a group of the customer codes can identify a single credit organization for payment. Each customer code in the group can have a different user name and unique credit limits. The inventive system also includes a graphic user interface that can receive a password on the customer computer to unlock the customer code.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
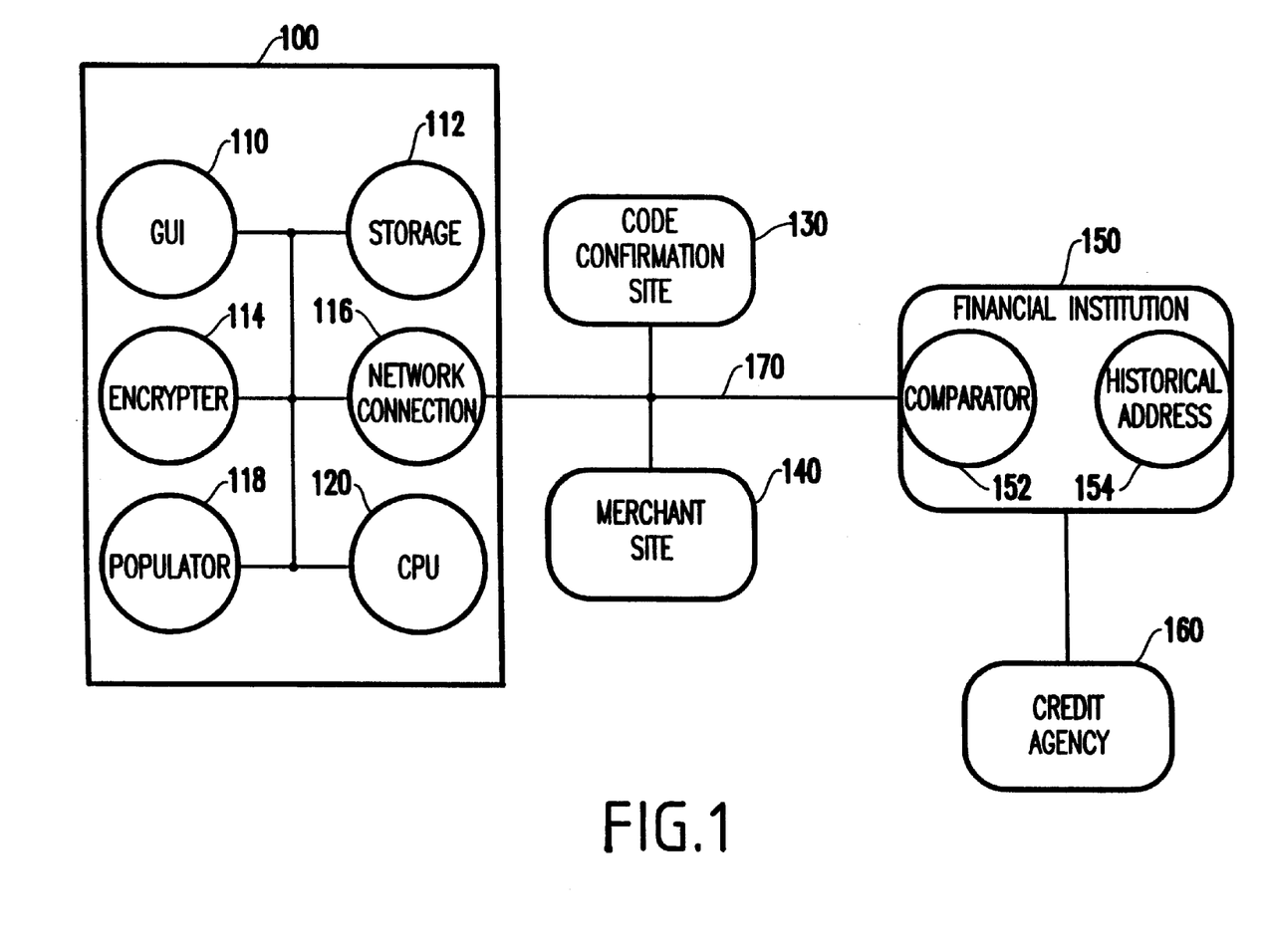
FIG. 1 is a schematic architectural diagram of one embodiment of the invention.

Referring now to the drawings, and more particularly to FIG. 1, a schematic diagram of a preferred embodiment of the invention is illustrated. More specifically, FIG. 1 illustrates a personal computer 100 connected to a network 170. In addition, a code confirmation site 130, merchant site 140, financial institution 150, and credit agency 160 are also connected to the network 170. The arrangement of features shown in FIG. 1 is arbitrarily selected in order to illustrate the invention. One ordinarily skilled in the art would understand that many other arrangements of items could be utilized with the invention.

The personal computer 100 (which is sometimes referred to herein as the "customer computer") comprises any form of computing device that is capable of connecting with the network 170. Therefore, the customer computer 100 can comprise a standard desktop personal computer, a mobile computer, a personal digital assistant, a cell phone, etc. In a preferred embodiment, the customer computer 100 includes a graphic user interface (GUI) 110, and a storage device 112, such as a magnetic hard drive or other read/write storage device. In addition, the customer computer 100 includes an encrypter 114, a network connection 116, a populator 118 and central processing unit (CPU) 120.

The financial institution 150 includes a database of historical addresses 154 obtained from the credit agency 160 and a comparator 152 that is utilized to check customer addresses, as discussed below.

Figure 2:
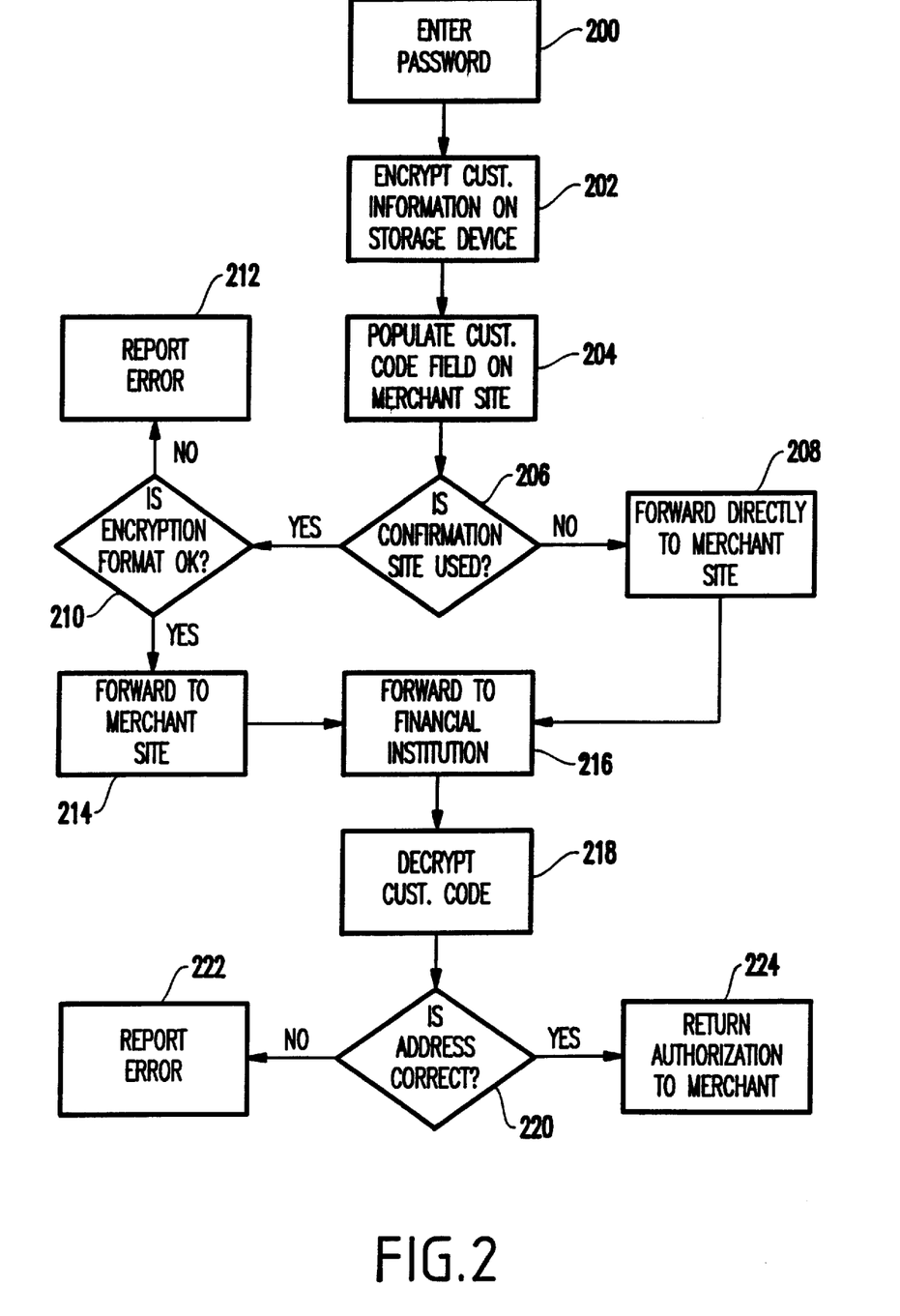
FIG. 2 is a flow diagram illustrating an embodiment of the invention.

The operation of the system shown in FIG. 1 is illustrated in flowchart form in FIG. 2. More specifically, the inventive system is added to the customer's computer 100. Using the graphic user interface 110, the customer preferably creates a password as shown in item 200 that will allow future access to the inventive system. The customer then supplies personal information such as Social Security number, address, date of birth, relatives' names, credit card information, banking information, employment information to the inventive system through the graphic user interface 110. The encrypter 114 immediately encrypts this information and stores the encrypted information as a customer code on the storage device 112, as shown in item 202.

An important feature of the invention is that the customers' personal information is only stored in encrypted form. Therefore, if an unauthorized user were able to access the user's storage device 112, the customers' personal information would be secure because of its encrypted nature.

The encryption process has three elements: 1) the encryption code itself, which is pared to the decryption code maintained by the financial institution; 2) the customer's private key, password and/or personal access code, which is created and controlled by the customer for accessing the encrypted information; and, 3) the customer's computer's system identifier that requires that the encrypted information may only be accessed on the customer's computer. Once the customer's information is entered, these three elements and the need to re-enter any of the information becomes transparent to all parties during any e-commerce transaction (e.g., dual key or public key).

If the encryption code were to fall into the hands of an unauthorized party, access to the information would still require the customer's private key plus access to the information from customer's specific storage system (e.g., customer's computer's system identifier). An unauthorized user would need the decryption code to access the information, which code is maintained only by the financial institutions (credit issuers) and their authorized agents. This element of the "public key" or "dual key" format of the preferred embodiment of the present invention enhances the security of the customer's information.

Even if an unauthorized user overcomes the foregoing safeguards, the present invention requires the user to supply an authorized shipping address; a procedure that requires a separate secured transaction with the financial institution, confirmed by e-mail to the customer. Such steps make impractical the unauthorized access.

In another embodiment of the invention, the user can create multiple customer codes, each of which could include a different credit agency (e.g., a different credit card). Therefore, the invention allows the user to create a customer code for each of the credit cards the user owns or for multiple, authorized users of a single card.

In addition, many customer codes can be created for the same credit card. These additional customer codes can include different spending limits. This allows the user to establish different customer codes for budgetary or other similar reasons. For example, with the invention, a user could create customer codes for different items of a personal or business budget. Upon reaching a spending limit, no additional transactions (purchases) could be performed until the budget information is changed or updated. The budget plan could be updated automatically to allow periodic budgets to be automatically implemented. An example of this could include one customer code that uses a credit card to pay monthly charges to an internet service provider (ISP) for a specific period, e.g., one year. The customer code would include a monthly limit of the monthly ISP fee and a twelve-month limit on the transaction. The additional advantage to the customer of this embodiment is the ability to amend or cancel the transaction at any time by changing the stated limits.

Similarly, parents could create customer codes for each of their children, where each customer code potentially includes a different spending limit. In one embodiment, the spending limits can be updated periodically to provide a periodic allowance. This aspect of the invention allows parents to establish a monthly Internet-allowance for a child. The parents establish a separately authorized customer code together with periodic limits (e.g., monthly or weekly). The effect of this is that the parent would control the establishment and use of authorized sub-accounts.

The effect of these aspects of the invention is that the financial institution would continue to control qualifying a customer for credit; however, the customer would enjoy an increased control over and use of that credit.

The customer codes preferably includes the name, address and credit card number of the user in encrypted form. Once the customer codes have been established and stored in encrypted form on the storage 112, the invention operates in the background on the customer's computer 100 until the customer desires to make a purchase over the network 170. At the time of a purchase, the graphic user interface 110 provides the user with different payment options (customer codes). After the user selects the appropriate customer code, the populator 118 prepares to send the customer code to the merchant's site 140 by issuing an instruction to send the customer code out on the network 170 directed to the merchant site 140, as shown in item 204.

Figure 3:
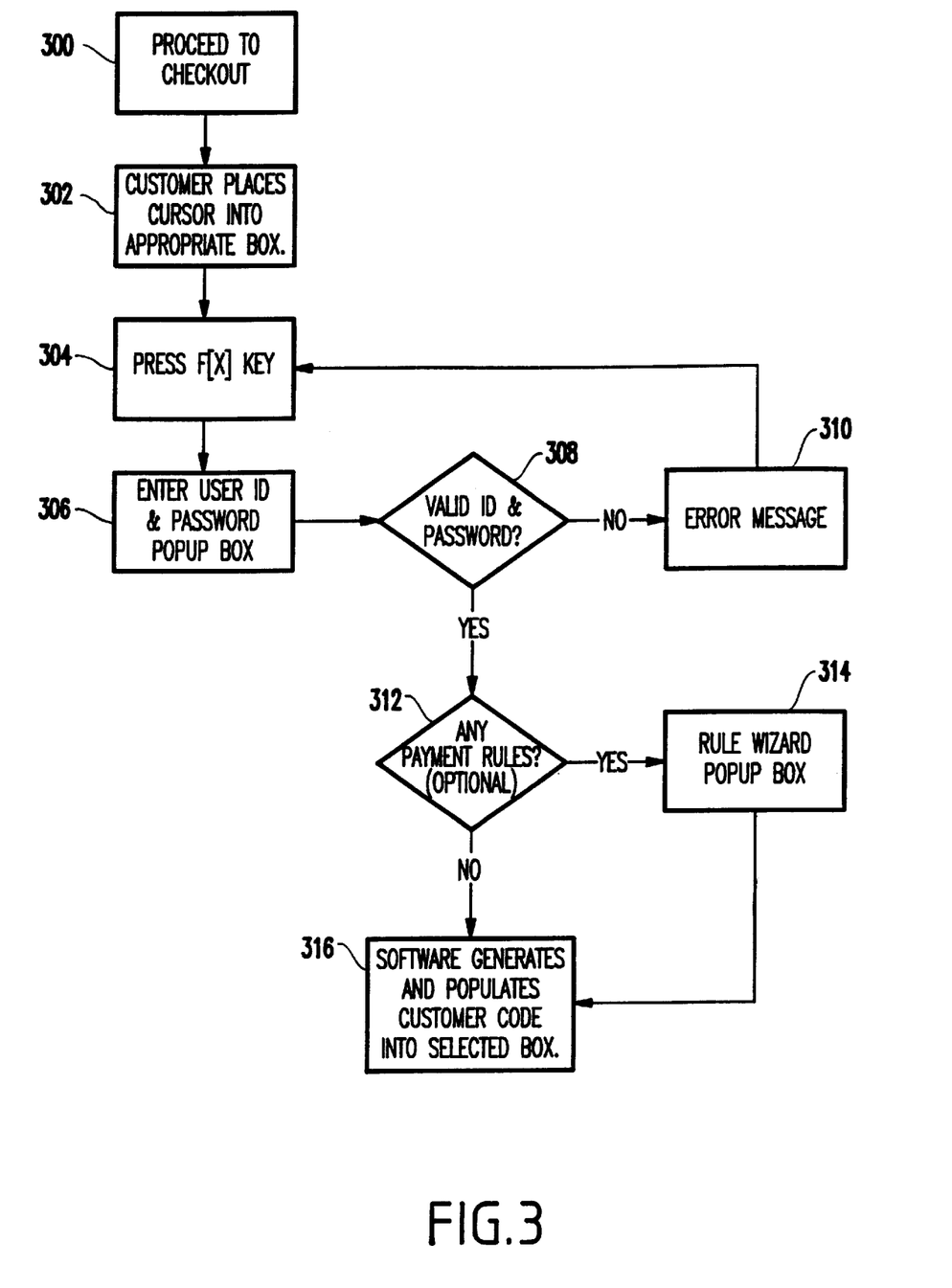
FIG. 3 is a flow diagram illustrating an embodiment of the invention.

The operation of the functions in item 204 are shown in greater detail in FIG. 3. More specifically, the invention provides for the customer code to automatically populate the appropriate "checkout" box of the merchant site 140 using the populator 118. As shown in FIG. 3, when the customer gets to a checkout (purchase) window of a merchant site, (300) the customer places the cursor into the appropriate box (e.g., the credit card number field, customer code data fields, etc.) 302. Many merchant sites 140 may not have space for the customer code data field; therefore, the invention allows the credit card number field/box(or other similar payment field) to be used by the merchant site. The encrypted customer code data field is longer than credit card numbers. Therefore, the only modification needed by the merchant site 140 to accommodate the invention is to allow longer encrypted data strings to be accepted by the credit card number field.

Once the user places the cursor in the appropriate box, they press a pre-established function key on the keyboard (or select a button on the graphic user interface) (304), which brings up a user ID and password entry pop-up window (306). Upon entry of the proper user ID and password, the entire customer code is populated (written to) the field on the merchant site (another embodiment of this step may include a "rule wizard," as discussed below). The user does not need to enter their name, address, etc. because all such information is contained in the customer code. As discussed below, upon approval of the credit transaction, the financial institution 150 will return name, shipping address and credit authorization number (not credit card number) to the merchant site 140 so that the user does not need to input such information.

If multiple customer codes are established for different credit cards, the user can select a customer code, which includes information as to a credit card with a sufficient credit limit, desirable interest rate, etc. to make the purchase. The customer code itself is the encrypted personal information data stream and can be somewhat lengthy. Therefore, the graphic user interface provides a user-friendly selection menu with abbreviated names. For example, in one embodiment, a pull-down menu with credit card abbreviations (306) is provided to allow the user to select the customer code to be used. If the user has established only one customer code, the pull down menu will include only that single customer code abbreviation. In a similar manner, different budget categories or children's names could also be utilized as the abbreviated names in the pull-down menu to select the appropriate customer code.

The user ID's are the customer codes abbreviations. An error message is generated if the user ID/password is incorrect (310) and processing returns to box 304 to retry the user ID/password. As is well-known a limited number of retries of the user ID/password will be allowed.

If the password/user ID is correct (308), the customer has the option to set up rules regarding payment (312), such as the automatic monthly ISP payments discussed above. If no special rules are to be established for payment, a single direct payment scheme is assumed and processing proceeds to box 316. On the other hand, if payment rules are to be established, another window pops-up (314) to lead the customer through a wizard to setup payment options such as transaction amounts, total credit limits, and/or time frames, etc.

In item 316, the invention then takes the previously encrypted sensitive customer data, and adds to it a purchase specific transaction number and rules (if any). The invention also encrypts such additional data (transaction number, rules, etc.) before attaching necessary routing information, and automatically populates the complete customer code into the customer code data field or credit card field 302. As mentioned above, the customer code is the encrypted data string of a number of data pieces including credit card number, rules, transaction number, customer name and address, etc.

Referring again to FIG. 2, in one embodiment the invention sends the customer code directly to the merchant site 140, as shown in item 208. In another embodiment, a code confirmation site 130 is utilized (item 206). In this embodiment, the customer code is directed to the code confirmation site 130 instead of to the merchant site 140 by the populator 118. The code confirmation site 130, controlled by the credit agency, determines whether the customer code has the proper format by allowing the credit agency to periodically update or change the public keys (e.g., the encryption and decryption codes). If the customer code is determined to be improper by the code confirmation unit 130, an error report is issued explaining that the customer code is improper, as shown in item 212. If the customer code is proper, it is sent to the merchant site 140 by the code confirmation unit 130, as shown in item 214.

Upon receipt of the customer code, the merchant site 140 forwards the customer code to the financial institution 150. An important feature of the invention is that confidential information is not provided to the merchant in unencrypted form at any time. Thus, the merchant is relieved of the responsibility for that information.

As shown in item 218, the financial institution decrypts the customer code. Next, while checking whether the credit transaction is acceptable (e.g., whether the customer has sufficient credit available), the financial institution also compares, using the comparator 152, the shipping address to which the goods are to be shipped against a historical database of acceptable shipping addresses 154 that is provided to the financial institution by the credit agency 160. This aspect of the invention prevents items from being improperly diverted by criminals to addresses other than the customer's address.

In one embodiment of the invention, the customer is able to establish multiple authorized shipping addresses directly with the credit agency. These addresses may include such alternatives as office or home. Each address is entered and stored on the customer's storage device with a separate encryption sequence as a separate customer code. At the time the customer is setting up new customer codes, new authorized addresses for the customer are sent (via e-mail or similar electronic transfer) directly from the customer computer 100 to the credit agency 160 over the network 170 and are augmented to the list of authorized addresses associated with the customer in the credit agency's 160 databases.

As shown in item 220, if the shipping address is consistent with an address in the database 154 and the customer has sufficient credit, a confirmation code, name, address, and other required information is sent to the merchant 140, as shown in item 224. In this instance, the term "consistent" means that the two addresses must be substantially matching. Thus, if a small portion of the street number or zip code is incorrect or if the spelling of the street name is slightly off, the transaction is approved and a corrected address is provided to the merchant. However, if the shipping address is directed to an address that is not consistent with an authorized address for that customer (e.g. different state, different city, different street, etc.), an error report is issued to the merchant site 140 and an e-mail is sent to the customer explaining the improper transaction.

Credit agencies currently use addresses to help determine authorization; however, their criteria for what constitutes a "consistent" address varies. The present invention creates a system for eliminating error and fraud in these authorizations by "correcting" the address. It is then the merchant's responsibility to ensure that the product only ships to the authorized or corrected address. This aspect of the present invention adds a layer of security, allowing the customer to "intercept" and return any unauthorized shipments.

In one embodiment of the invention, the customer uses the "rule wizard" [314] to establish single transaction "rules." These variations might include setting limits to recurring credit card charges (e.g., establishing the amount for monthly charges to an ISP). The rules might also allow setting a limit to the term of recurring charge (e.g., allowing the recurring monthly ISP charges to be limited to a twelve-month period). The rule might also allow the authorized customer to temporarily add a "non-permanent" shipping address, allowing the customer to send gifts, etc., to others. The customer's computer's system identifier and password are required to access the "wizard" for this non-recurring change. Additionally, a confirmation of this shipment to a non-authorized address is e-mailed to the customer so that the customer may be alerted if a fraudulent transaction were being attempted.

As mentioned above, the merchant site 140 preferably includes an input field (which may be the current credit card field) properly formatted to receive the customer code. The format of the input field is established by the credit agency 160 and is similarly required by the financial institution 150. There are a relatively small number of national credit agencies 160 (Visa®, MasterCard®, American Express®, etc.). The credit agency 160 can generally dictate the format of information that must be supplied by the more numerous financial institutions 150 that deal with the credit agency 160. In turn, merchant sites 140 that desired to deal with the financial institutions 150 must comply with the data format requirements of the financial institution 150 (and, in turn, the credit agency 160). Therefore, the invention is applicable to a network that continually adds and drops large numbers of merchant sites 140, such as the Internet. More specifically, as merchant sites 140 are added to the network, each merchant site 140 will comply with the requirements of the financial institution 150 and will include the specialized format of the customer code data field in their merchant sites 140. Therefore, the user should find the customer code data field on the vast majority of Web sites that allow customer purchases.

In other words, the invention works with the relatively small number of national credit agencies 160 to establish a format (that can potentially vary from credit card agency to credit card agency) that will be made available by the merchants 140. Because a limited number of credit agencies 160 control the majority of the online credit purchase transactions, the format of the customer code input field will be provided upon the vast majority of merchant sites 140. Thus, the invention provides the user with access to virtually all merchant sites 140 that desire to deal with financial institutions (which is virtually all merchant sites that desire to complete purchase transactions).

The credit agencies [160] are in the business of getting customers to use credit (e.g., their credit cards). Where the present invention creates security for the customer, together with additional control and use features, the credit agencies derive a promotional benefit for their credit facilities. Moreover, these beneficial features do not require extra steps. A benefit of the present invention is that it eliminates steps that include repeated entry of customer information or the posting of that information on third-party databases.

An important safety feature of the invention is that the merchant site 140 never gains access to the customer's confidential information, such as credit card numbers. To the contrary, the merchant site 140 only receives the encrypted customer code from the customer 100 and the transaction confirmation code (and possibly a corrected address) from the financial institution 150. Therefore, if any of the foregoing transactions over the network 170 are intercepted or if the merchant site suffers an unauthorized access of its records, the customer's credit card information will be secure.

Further, the invention avoids many of the problems associated with conventional secured network transactions. More specifically, all elements of the present invention must be in place for a transaction to be completed. Conventional systems provide one level of security to all transactions, so that if a database is breached all of the records on that "secured" site are accessible. The present invention protects individual records creating an additional level of security.

The benefits that flow from the present invention, as detailed above, include security to an individual customer's online credit and the customer's control and flexible use of that credit.

While the invention has been described in terms of preferred embodiments, those skilled in the art will recognize that the invention can be practiced with modification within the spirit and scope of the appended claims.

What is claimed is:

1. A method of securing transactions over a computer network comprising:

encrypting customer information as customer codes on a storage device on a customer computer, said customer computer being connected to said computer network, wherein said customer codes include encrypted identifiers including a customer shipping address, and wherein said customer shipping address comprises one of a plurality of valid shipping addresses that depend upon which customer code is supplied to said merchant;

selecting one of a plurality of stored customer codes having one of said plurality of valid shipping addresses;

supplying said selected customer code to said merchant in a transaction over said computer network;

forwarding said customer code to a financial institution over said computer network;

decrypting said customer code at said financial institution;

comparing, at said financial institution, said customer shipping address with an authorized address of said customer maintained by said financial institution; and returning an authorization decision from said financial institution to said merchant over said computer network, wherein said authorization decision is approved only if said customer shipping address and said authorized address are consistent.

2. The method in claim 1, wherein said customer code is stored on said storage device only in encrypted form.

3. The method in claim 1, wherein said customer code includes encrypted credit card information.

4. The method in claim 1, further comprising passing said customer code through an intermediate code confirmation site on said computer network prior to forwarding said customer code to said financial institution over said computer network, said intermediate confirmation site confirming whether said customer code has a proper encryption format.

5. The method in claim 1, further comprising encrypting a plurality of said customer codes on said storage device, wherein each of said customer codes includes a unique payment method.

6. The method in claim 1, further comprising encrypting a plurality of said customer codes on said storage device, wherein a group of said customer codes identifies a single credit organization for payment, wherein each customer code in said group includes a different user name, and wherein each customer code in said group includes a unique credit limit.

7. The method in claim 1, wherein said supplying includes entering a password on said customer computer to unlock said customer code.

8. The method in claim 1, wherein entry of said password allows rules to be established for each transaction, wherein limits on transactional amounts and payment time frames may be established.

9. A method of securing transactions over the Internet comprising:

encrypting customer credit card information as customer codes on a storage device on a customer computer, said customer computer being connected to said Internet, wherein said customer codes include encrypted identifiers including a customer shipping address, and wherein said customer shipping address comprises one of a plurality of valid shipping addresses that depend upon which customer code is supplied to a merchant;

selecting one of a plurality of stored customer codes having one of said plurality of valid shipping addresses;

supplying said selected customer code to said merchant in a transaction over said Internet;

forwarding said customer code to a financial institution over said Internet;

decrypting said customer code at said financial institution;

comparing, at said financial institution, said customer shipping address with an authorized address of said customer maintained by said financial institution; and returning an authorization decision from said financial institution to said merchant over said Internet, wherein said authorization decision is approved only if said customer shipping address and said authorized address are consistent.

10. The method in claim 9, wherein said customer code is stored on said storage device only in encrypted form.

11. The method in claim 9, further comprising passing said customer code through an intermediate code confirmation site on said Internet prior to forwarding said customer code to said financial institution over said Internet, said intermediate confirmation site confirming whether said customer code has a proper encryption format.

12. The method in claim 9, further comprising encrypting a plurality of said customer codes on said storage device, wherein each of said customer codes includes a different credit card number.

13. The method in claim 9, further comprising encrypting a plurality of said customer codes on said storage device, wherein a group of said customer codes identify a single credit card for payment, wherein each customer code in said group includes a different user name, and wherein each customer code in said group includes a unique credit limit.

14. The method in claim 13, wherein said unique credit limits include unique recurring periodic spending limits.

15. The method in claim 9, wherein said supplying includes entering a password on said customer computer to unlock said customer code.

16. A system for securing transactions over a computer network, said system operating on a customer computer, said system comprising:

an encrypter adapted to encrypt customer information as customer codes on a storage device on said customer computer, wherein said customer codes include encrypted identifiers including a customer shipping address, and wherein said customer shipping address comprises one of a plurality of valid shipping addresses that depend upon which customer code is supplied to a merchant;

a graphical user interface adapted to select one of a plurality of stored customer codes having one of said plurality of valid shipping addresses:

a populator adapted to supply said selected customer code to said merchant in a transaction over said computer network;

wherein said merchant includes a network connection adapted to forward said customer code to a financial institution over said computer network;

wherein said financial institution decrypts said customer code;

wherein said financial institution includes a comparator adapted to compare said customer shipping address with an authorized address of said customer maintained by said financial institution;

wherein said financial institution returns an authorization decision to said merchant over said computer network, and wherein said authorization decision is approved only if said customer shipping address and said authorized address are consistent.

17. The system in claim 16, wherein said customer code is stored on said storage device only in encrypted form.

18. The method in claim 16, wherein said financial institution corrects errors in said customer shipping address and returns a corrected address to said merchant.

19. The system in claim 16, wherein said customer code includes encrypted credit card information.

20. The system in claim 16, further comprising an intermediate code confirmation site external to said customer computer and connected to said computer network, said intermediate code confirmation she being adapted to receive said customer code prior to forwarding said customer code to said financial institution over said computer network, said intermediate confirmation site being further adapted to confirm whether said customer code has a proper encryption format.

21. The system in claim 16, wherein said encrypter is further adapted to encrypt a plurality of said customer codes on said storage device, wherein each of said customer codes includes a unique payment system.

22. The system in claim 16, wherein said encrypter is further adapted to encrypt a plurality of said customer codes on said storage device, wherein a group of said customer codes identify a single credit organization for payment, wherein each customer code in said group includes a different user name, and wherein each customer code in said group includes a unique credit limit.

23. The method in claim 22, wherein said unique credit limit include unique recurring periodic spending limits.

24. The system in claim 16, further comprising a graphic user interface adapted to receive a password on said customer computer to unlock said customer code.

25. A method of securing transactions over a computer network comprising:

encrypting customer information as customer codes on a storage device on a customer computer, said customer computer being connected to said computer network, wherein said customer codes include encrypted identifiers including a customer shipping address, and wherein said customer shipping address comprises one of a plurality of valid shipping addresses that depend upon which customer code is supplied to a merchant;

selecting one of a plurality of stored customer codes having one of said plurality of valid shipping addresses;

supplying said selected customer code to said merchant in a transaction over said computer network;

forwarding said customer code to a financial institution over said computer network;

decrypting said customer code at said financial institution;

comparing, at said financial institution, said customer shipping address with an authorized address of said customer maintained by said financial institution; and returning a customer name, a customer shipping address, and an authorization decision from said financial institution to said merchant over said computer network, wherein said authorization decision is approved only if said customer shipping address and said authorized address are consistent.

26. The method in claim 25, wherein said customer shipping address is previously established with, and stored at said financial institution by the customer.

27. A method of securing transactions over the Internet comprising:

encrypting customer credit card information as customer codes on a storage device on a customer computer, said customer computer being connected to said Internet, wherein said customer codes include encrypted identifiers including a customer shipping address, and wherein said customer shipping address comprises one of a plurality of valid shipping addresses that depend upon which customer code is supplied to a merchant;

selecting one of a plurality of stored customer codes having one of said plurality of valid shipping addresses;

supplying said selected customer code to said merchant in a transaction over said Internet;

forwarding said customer code to a financial institution over said Internet;

decrypting said customer code at said financial institution;

comparing, at said financial institution, said customer shipping address with an authorized address of said customer maintained by said financial institution; and returning a customer name, a customer shipping address, and an authorization decision from said financial institution to said merchant over said Internet, wherein said authorization decision is approved only if said customer shipping address and said authorized address are consistent.

28. The method in claim 27, wherein said customer shipping address is previously established with, and stored at said financial institution by the customer.

29. A system for securing transactions over a computer network, said system operating on a customer computer, said system comprising:

an encrypter adapted to encrypt customer information as customer codes on a storage device on said customer computer, wherein said customer codes include encrypted identifiers including a customer shipping address, and wherein said customer shipping address comprises one of a plurality of valid shipping addresses that depend upon which customer code is supplied to a merchant;

a graphical user interface adapted to select one of a plurality of stored customer codes having one of said plurality of valid shipping addresses;

a populator adapted to supply said selected customer code to said merchant in a transaction over said computer network;

wherein said merchant includes a network connection adapted to forward said customer code to a financial institution over said computer network;

wherein said financial institution decrypts said customer code;

wherein said financial institution includes a comparator adapted to compare said customer shipping address with an authorized address of said customer maintained by said financial institution;

wherein said financial institution returns a customer name, a customer shipping address, and an authorization decision to said merchant over said computer network, and wherein said authorization decision is approved only if said customer shipping address and said authorized address are consistent.

30. The system in claim 29, wherein said customer shipping address is previously established with, and stored at said financial institution by the customer.

* * * * *